United States Patent [19]

Neff et al.

[11] 4,053,014

[45] Oct. 11, 1977

[54] FINNED TUBE COIL

[75] Inventors: Edward C. Neff, Norman; Howard F. Spicer, Oklahoma City, both of Okla.

[73] Assignee: Westinghouse Electric Corporation, Pittsburgh, Pa.

[21] Appl. No.: 580,506

[22] Filed: May 23, 1975

[51] Int. Cl.$^2$ .............................. F28F 1/18; F28F 1/32
[52] U.S. Cl. .................. 165/150; 29/157.3 R; 29/157.6; 62/526
[58] Field of Search .................. 29/157-313, 29/157.4, 157.6; 113/118 B; 165/150.1, 149, 144, 175, 176, 150; 62/515, 526

[56] References Cited

U.S. PATENT DOCUMENTS

| 2,669,099 | 2/1954 | Malkuff | 165/150 X |
|---|---|---|---|
| 2,759,248 | 8/1956 | Burgess | 165/150 X |
| 3,030,782 | 4/1962 | Karmazim | 165/150 |
| 3,097,507 | 7/1963 | Makuh | 165/144 |
| 3,833,986 | 9/1974 | DeCicco | 29/157.3 B |
| 3,961,513 | 6/1976 | Stahly | 29/157.6 |

Primary Examiner—Ronald H. Lazarus
Assistant Examiner—Theophil W. Streule, Jr.
Attorney, Agent, or Firm—E. C. Arenz

[57] ABSTRACT

A multi-row, finned tube heat exchange coil is made in a process particularly useful where the tubes and end fittings are both of aluminum, by arranging all of the hairpin-shaped tubes with their bights on the one end of the coil along with all of the complex connecting fittings such as tripods, inlet and outlet distributor headers and crossovers, and with the return bends all being arranged at the other end of the coil, and then soldering all of the return bends to the open ends of the tubes at that end of the coil.

2 Claims, 5 Drawing Figures

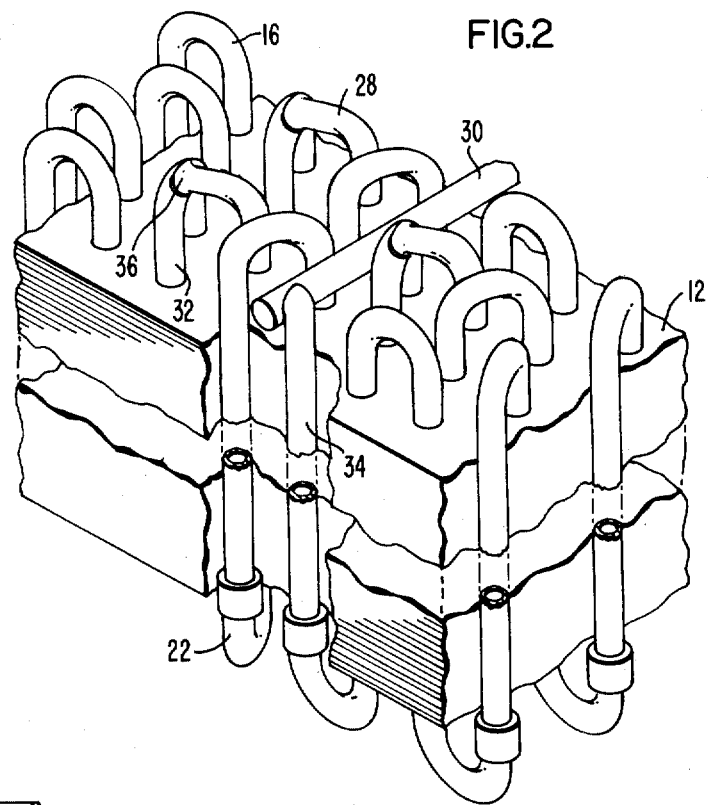
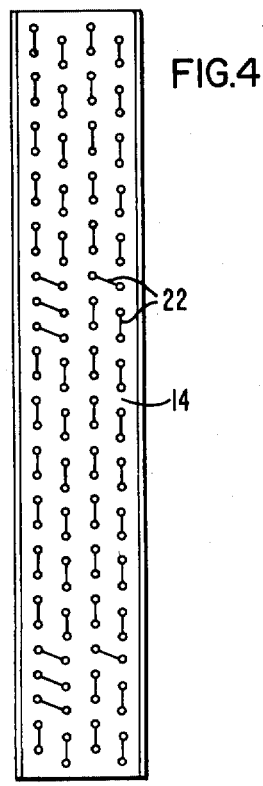
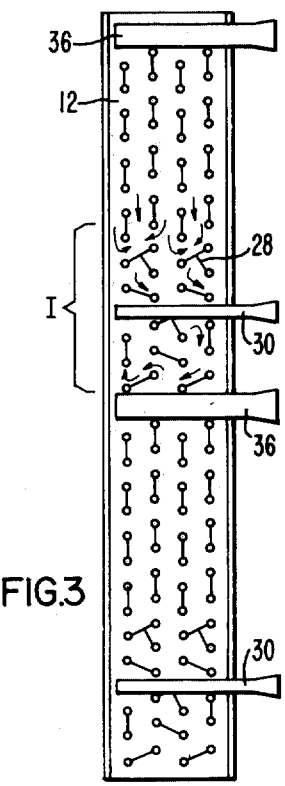

FINNED TUBE COIL

BACKGROUND OF THE INVENTION

1. Field of the Invention

The invention pertains to the art of finned tube coils.

2. Description of the Prior Art Soldering aluminum end fittings to aluminum tubes in heat exchangers has posed a problem believed to be generally recognized. If the coils are simple one or two row coils with a simple tube circuiting arrangement and basically only return bends being used to connect the open ends of the tubes, the manufacture of such coils has been reasonably successful without an unduly high percentage of leaking coils. In our experience this has not been the case with coils having three or four or more rows and containing complex tube circuitry requiring the use of complex fittings such as tripod joints, various header configurations, and crossovers. To the best of our knowledge such coils have been made with all of the hairpin tube bights located at one end of the coils, and all of the complex fittings and return bends located at the other end of the coil. the purpose of such an arrangement of course is that all of the soldering will take place at the one end of the coil in a superhaeated air atmosphere (Pyronics) or by flame soldering (Selas) or in an ultrasonics process. In the Pyronics and Selas processes a reaction type flux and high temperature solder is used. The problem that we recognize in making the coil in this way is that each different type of fitting presents a different heat transfer problem in obtaining a good joint. Thus when the temperature is adequate for header joints it may be too hot for crossover joints and/or return bends and/or tripods. Thus, the joining process is simplified and made more reliable when the pieces are identical.

If the soldering of such a coil is to take place by an ultrasonic process, no opening to the interior of the coil is permitted to be immersed in the molten solder since it would create a blockage inside the coil. Such openings exist in the inlet and outlet headers which must have breather tubes attached to them to prevent the solder from getting into the tube and to provide venting during the soldering process.

When a coil is manufactured by the above methods and is found to be a leaker, it is expensive and difficult to repair the joints. In some cases where a number of the joints are sufficiently damaged, the coil is scrapped.

The aim of our invention is to provide a coil construction which, for the most part, avoids the problems experienced in the prior art.

SUMMARY OF THE INVENTION

In accordance with the invention, the coil construction includes all of the complex fittings and bight portions of the hairpin tubes at the one end of the coil so that only the return bends are located at the other end of the coil. With this arrangement there is only one simple type of joint, having uniform heat transfer characteristics, presented to the heating device. Accordingly, the precise time-temperature-flux control required when attempting to solder the diverse fittings when using a reaction type flux and heat is avoided. Or, if the ultrasonic process is to be used, the problem of immersion of an open end, or the need for breather tubes, is avoided. Finally, in the preferred form of the invention each of the complex fittings includes not only the end connection part but includes tube portions sufficiently long to extend through the coil to the other end to receive return bends.

DRAWING DESCRIPTION

FIG. 2 is a view similar to FIG. 1 showing the arrangement of the coil according to the invention;

FIG. 3 is an end view of a refrigerant condenser coil of the type to which the invention is well suited, and showing the tube circuiting pattern diagrammatically;

FIG. 4 is a view similar to FIG. 3 showing the other end of the coil and the tube circuiting arrangement diagrammatically.

DESCRIPTION OF THE PREFERRED EMBODIMENT AND METHOD

Figure 1:
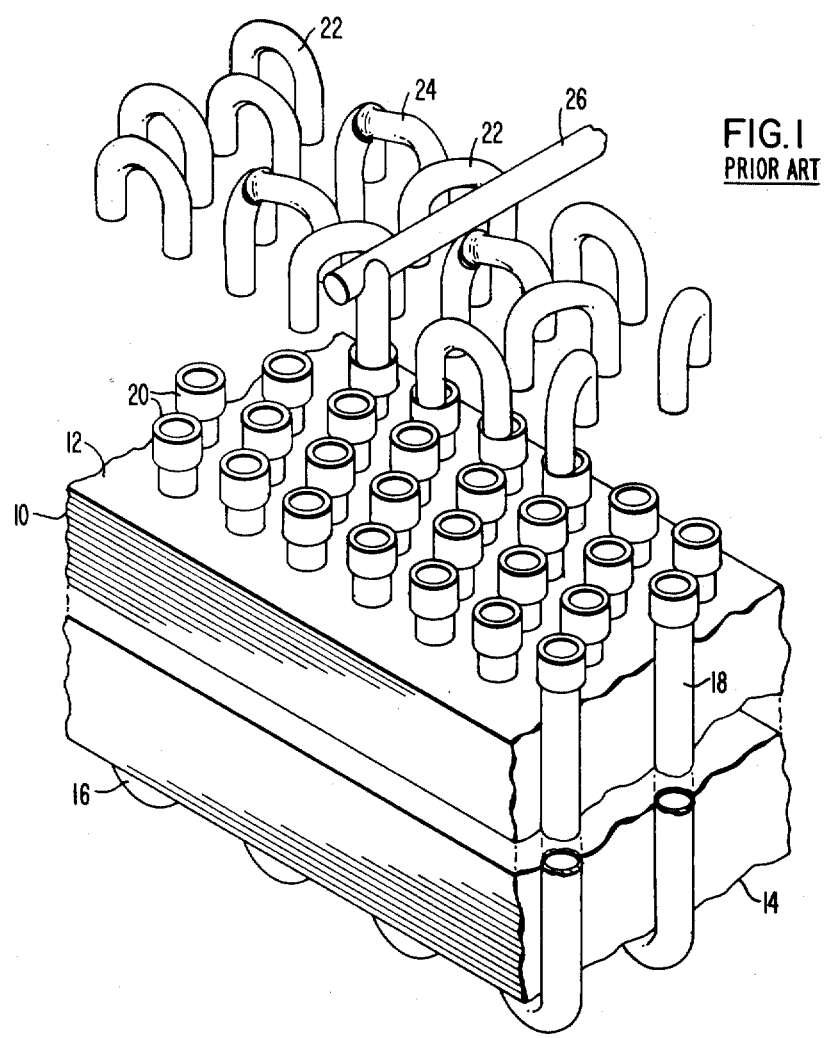
FIG. 1 is an exploded, isometric view of a part of a coil made in accordance with, and having an arrangement of, the prior art.

The part of the prior art condenser coil illustrated in FIG. 1 corresponds to that part of the coil in FIG. 3 carrying the bracket I. As is conventional the coil includes a number of stacked and spaced apart apertured aluminum fins 10, with end plate 12 on the one end of the coil and end plate 14 on the other end of the coil. A number of hairpin-shaped aluminum tubes (hereinafter called hairpin tubes), are arranged with their bight portions 16 at that end of the coil having end plate 14, and with the relatively long leg portions 18 of the hairpin tubes extending through the apertures of the fins and with their open ends 20 projecting beyond the end plate 12.

As is conventional in the art, after the hairpins have been assembled to the fins and end plates, the diameters of all of the tubes are enlarged or expanded enough to fit tightly against the fin material forming the apertures. At the same time or later, the open ends 20 are expanded sufficiently to form a typical bell-type joint so that whatever fitting is to be applied to it is received telescopically.

In FIG. 1 the conventional connecting fittings shown include return bends 22 which may be used to connect open ends 20 of any two adjacent tubes; tripods 24 which may be used to connect the open ends of any three adjacent tubes which form an equiangular triangle; and an outlet header 26 which in the illustrated example is connected to a single tube open end 20 and is adapted to be connected to a line to carry liquid, vapor or liquid/vapor refrigerant. Another form of connecting fitting which is conventional but not illustrated is called a crossover which is similar to a return bend but longer so that it can span more than one row of the tubes. The tripods and outlet header are herein characterized as complex fittings in that they include at least one bonded joint which is made before the complex fitting is applied to the open tube ends of the coil. The diverse character of these fittings coupled with the requirement for a precise time-temperature-flux control leads to the problem of bad joints and damaged parts and tube ends when the upper end of the coil is subjected to the heating device intended to accomplish the soldering.

In accordance with the preferred construction of a coil according to the invention (a part of the coil being shown in FIG. 2) the bight portion 16 of the hairpin tubes and all of the complex fittings including the tripods 28 and the outlet header 30 are located with their connecting portions at the one end 12 of the coil. In the preferred form of the invention the tripods 28 differ from the tripods 24 in that the tripods 28 include tube lengths 32 sufficiently long to extend from one end of the coil to the other. The outlet header 30 also has an extended tube length 34 which passes all the way through the length of the coil. In other word, the difference between the tripods 24 and 28, and the outlet header 26 and 30, is that the tube lengths 32 and 34 comprise unitary parts of the fittings. Thus a tripod 28 may be viewed as a hairpin and a half, with the half hairpin being joined to the bight of the full hairpin at location 36. While the total number of joints required for the coil would be the same because the return bends 16 must be connected to the bottom ends of the tripod tube lengths 32 and the outlet header tube length 34, all of the joints are made at the one end of the coil with the same type of fitting being used, that is the return bends 16. It is within the contemplation of the invention, however, that the tripods can be made up with the elongate tubes 32 individually soldered to the short type tripod 24 of FIG. 1 and that the so-fabricated tripod be assembled to the coil.

In FIGS. 3 and 4 the tube circuiting arrangement of a condenser coil to which the invention may be applied, for example, is shown with the different orientations of the fittings and hairpin bights to obtain a particular circuiting being illustrated diagrammatically. The basic coil is a four row, staggered tube arrangement with two inlet distributing headers 36 and two outlet headers 30. the flow in the upper half of the coil of FIG. 3 is separate from the flow in the lower half of the coil. Hot gas refrigerant is admitted into each of the four rows of tubes through both the inlet headers 36 and flows in the direction indicated by the arrows in FIG. 3. The flow from the four rows is combined into two separate flows at the first set of tripods 28 as condensation of the refrigerant occurs. The two separate flows are then combined into one flow at the next tripod, with the single flow path being that indicated by the directional arrows and to the single inlet tube of the outlet header 30. the flow paths of the refrigerant of the other half of the coil illustrated in FIG. 3 is the same as the half described. It will be appreciated that in any given coil the circuiting path may be quite different in accordance with the proposed service of the coil. Thus the coil may have more or fewer complex fittings and which are arranged differently from that shown in FIGS. 3 and 4.

Figure 5:
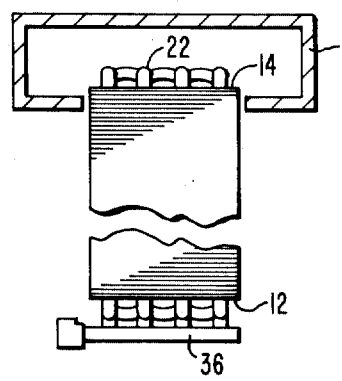
FIG. 5 is a partly diagrammatic view of a coil according to the invention undergoing a soldering operation.

After the coil has been assembled the soldering operation takes place in any conventional fashion. As an example, in FIG. 5 an oven 38 has superheated air in it and the end 14 of the coil with all of the return bends 22 in place is passed through the oven to effect the soldering. It will be noted that all of the complex fittings and the hairpin bights are at the opposite end of the coil. Therefore, the different heat transfer problems experienced with the diverse types of fittings are avoided. It will be appreciated that the other soldering porcesses conventionally known for joining aluminum to aluminum, such as flame soldering, and ultrasonic soldering may also be used in accordance with the invention. In the ultrasonic soldering operation, the return bends will be partly immersed in the soldering pot and the end of the coil 12 having complex fittings will be at the top. Thus with this arrangement, the tubes vent through the inlet and outlet fittings 30 and 36, and no special plug and breather devices are required for the inlet and outlet.

What is claimed is:

1. A multi-row, finned tube coil having opposite ends, comprising:
    a number of apertured fins stacked and spaced apart in parallel relation between the opposite ends of the coil, the apertures in said fins being in aligned relation;
    a number of aluminum hairpin tubes, each having a bight portion and two leg portions, said leg portions extending through said apertures in a direction locating all of said bight portions at one end of said coil;
    at least some of said hairpin tubes being oriented, relative to the planes of the rows of the tubes, to interconnect at least some of the rows of tubes at selective locations at said one end;
    a number of complex fittings including interconnecting portions and straight tube length portions, all of said interconnecting portions being located at said one end of said coil some of said interconnecting portions furthering the interconnection of at least some of the rows of tubes at other selective locations, and others of said interconnecting portions providing inlet and outlet connections to said coil, said straight tube lengths extending through apertures other than those occupied by said hairpin tubes; and
    return bends at the other end of said coil for connecting the open ends of said hairpin tubes to each other and to said straight tube lengths, whereby all said bights of said hairpin tubes, and all said interconnecting portions of said complex fittings are located at one end of said coil and all of said return bends are located at the other end of said coil.

2. In a multi-row, finned tube coil having opposite ends and including an aluminum fin stack, a number of hairpin tubes extending through apertures in said stack, complex fittings including interconnecting portions and straight tube length portions, and return bends;
    said hairpin tubes being assembled to extend through the apertures in said fins and having all of the bight portions of said hairpin tubes and all of the interconecting portions of the complex fittings being at one end of the coil, and with all of the return bends being at the other end of the coil;
    said hairpin tube bight portions and said interconnecting portions of said complex fittings being in selective orientation to effect interconnections between the rows of said tubes at selective locations to obtain the desired tube circuiting pattern for the coil.

* * * * *